May 30, 1933.   W. S. THOMAS   1,911,407
JUNCTION BOX COVER
Filed May 4, 1929   2 Sheets-Sheet 1
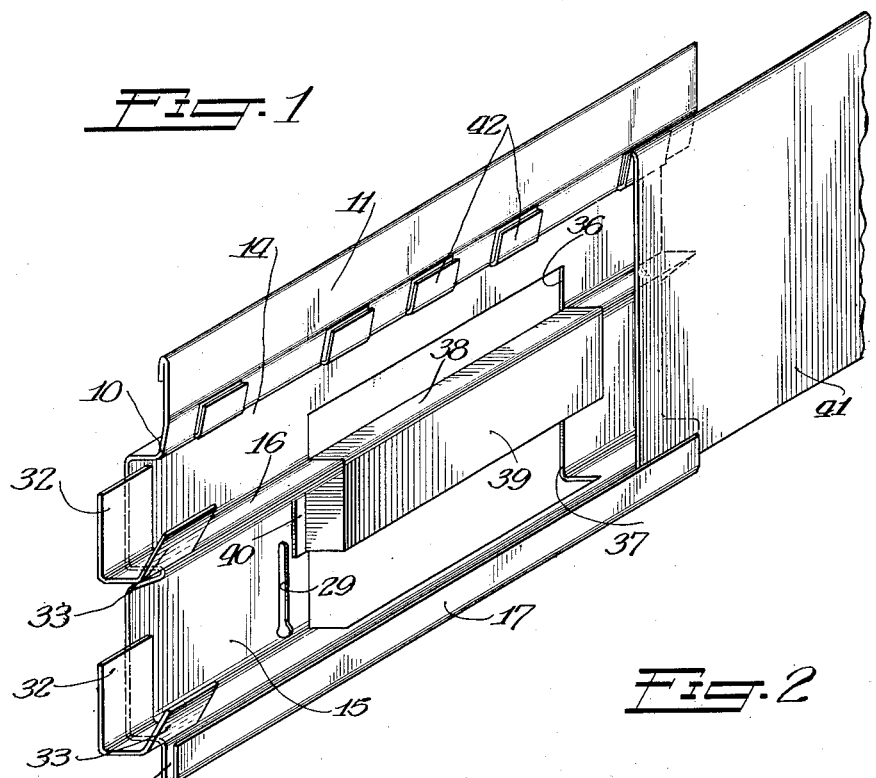
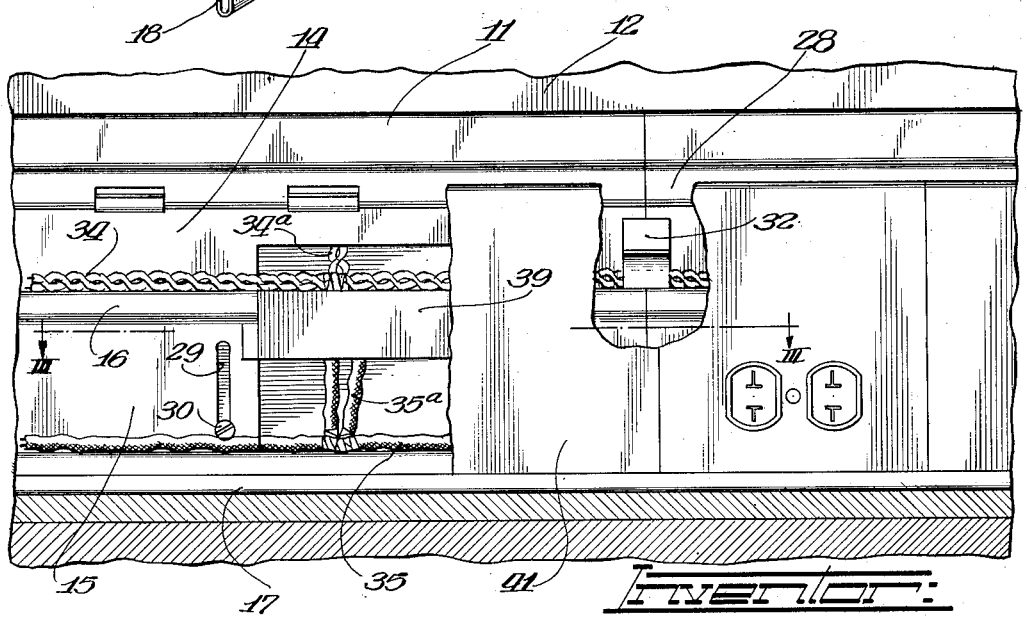
Inventor:
Wingate S. Thomas.
by Charles W. Bell
Attys.

May 30, 1933.   W. S. THOMAS   1,911,407
JUNCTION BOX COVER
Filed May 4, 1929   2 Sheets-Sheet 2
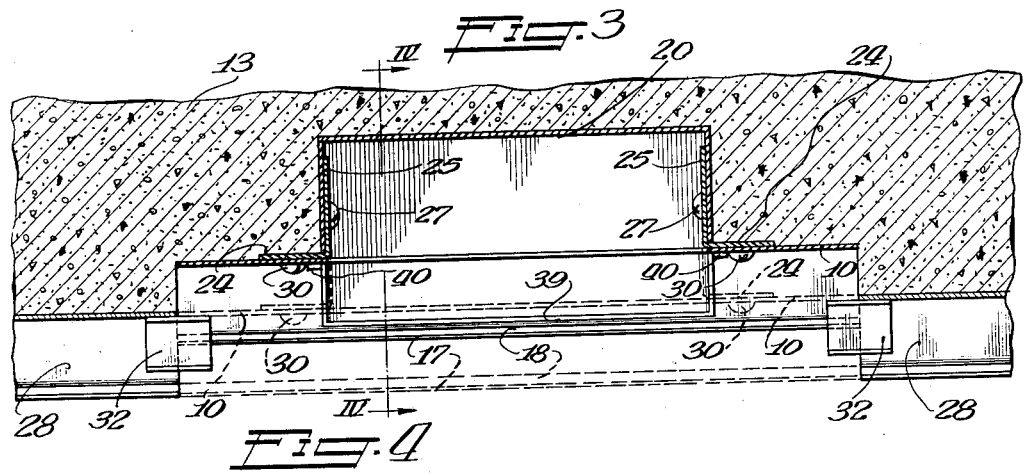
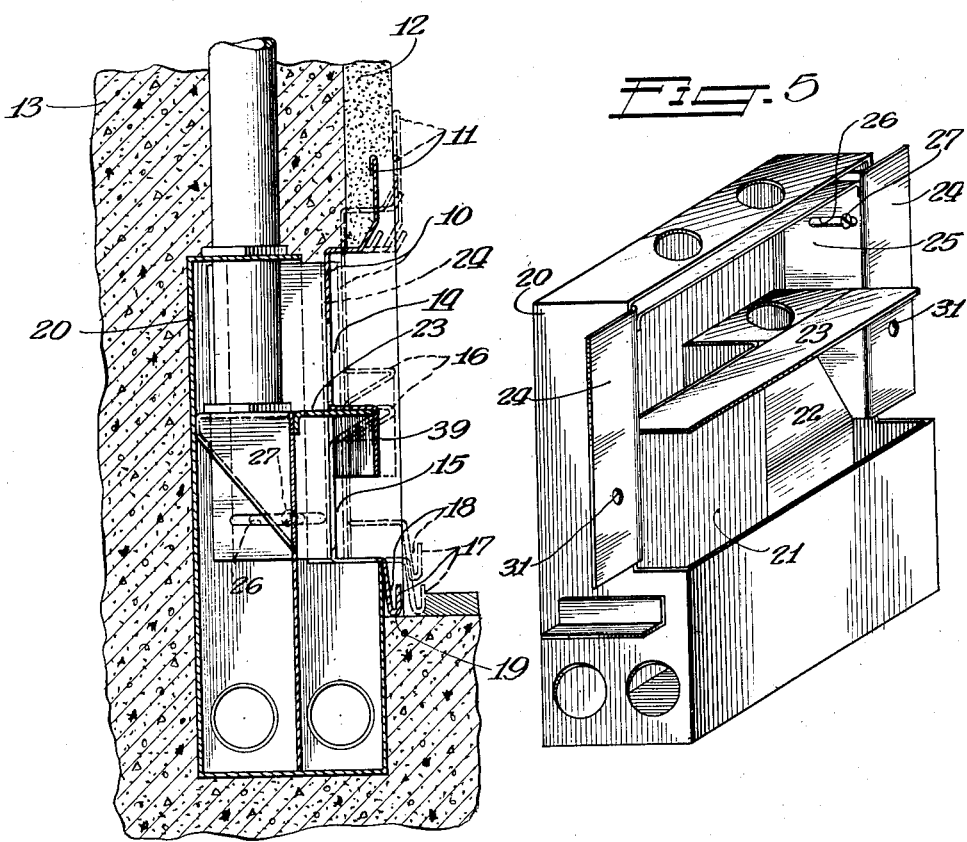
Inventor:
Wingate S. Thomas.
by Charles W. Bills
Attys Patented May 30, 1933

1,911,407

UNITED STATES PATENT OFFICE

WINGATE S. THOMAS, OF CHICAGO, ILLINOIS, ASSIGNOR TO KNAPP BROS. MANUFACTURING COMPANY, OF CHICAGO, ILLINOIS, A CORPORATION OF ILLINOIS

JUNCTION BOX COVER

Application filed May 4, 1929. Serial No. 360,568.

This invention relates to improvements in a cover for an outlet or junction box having separate entrances thereto for separate electrical conductors, the present invention being highly desirable for various uses as will be apparent to one skilled in the art.

In the past, many and various types of outlet or junction box covers have been developed, and, while these covers were suitable and desirable for certain purposes, yet they were not of the right type or character for proper association in a flexible distribution system for supplying electric current to various localities within a building or the like. Especially was this true with regard to that type of flexible distribution system which incorporates the use of a wall base having a plurality of separate conduit-like passages or raceways for conductors, in most instances, one raceway containing low tension conductors, another raceway containing high tension conductors, etc. These formerly known covers were chiefly objectionable in that they were not of the right configuration or shape for a nice association with such a wall base, nor did they provide a plurality of openings leading from the raceways so that separate conductors could pass therethrough and still be insulated from every other conductor, and, in addition, they were not sufficiently flexible to properly overcome characteristics or irregularities in the construction adjacent the particular place of installation.

The present invention has been designed to overcome the above noted as well as other defects and objections in the provision of an outlet or junction box cover formed to provide a plurality of raceways for electrical conductors and having openings individual to and leading from the aforesaid raceways.

The invention also seeks the provision of an outlet or junction box cover having a size and shape similar to a wall base so that the cover may be inserted or included in the base and form substantially an integral part thereof.

Another object of the present invention is to provide a junction box cover having at least a pair of separate passageways for different conductors, and which may be adjustably connected to a junction box so as to compensate for irregularities in construction at a particular place of installation.

While some of the more salient features, characteristics and advantages of a device embodying this invention have been above pointed out, others will become apparent from the following disclosures.

The invention includes these and other features of construction and combinations of parts hereinafter described and shown in a preferred form in the drawings, as more particularly indicated by the claims.

On the drawings:

Figure 1 is a perspective view of a device embodying principles of the present invention showing the same equipped with a front plate.

Figure 2 is a fragmentary elevational view showing the device installed in useful position.

Figure 3 is a fragmentary plan sectional view taken substantially as indicated by the line III—III of Figure 2, with parts omitted.

Figure 4 is a fragmentary vertical sectional view taken substantially as indicated by the line IV—IV of Figure 3, and indicating various adjustments of the device.

Figure 5 is a perspective view of an outlet or junction box to which the device may be attached.

As shown upon the drawings:

In the structure selected to illustrate an embodiment of the present invention, there is shown an outlet or junction box cover of which the main or body portion 10 is preferably formed of a single piece of sheet metal. This body portion is provided with an upwardly extending flange 11 which engages with the front face of plaster or other finishing 12 on a wall 13. Immediately below the flange 11, the body portion 10 is pressed inwardly to form an upper conduit-like passageway 14, and a lower conduit-like passageway 15, these passageways being separated by a forwardly extending bead 16. At the forward edge of the lower wall of the passageway or raceway 15, a downwardly and then upwardly turned flange 17 is provided which defines a groove 18 between the parallel portions thereof, the lower edge of this flange preferably abutting the floor line as indicated at 19 in Figure 4 when the device is installed.

In the present instance, there is shown a box 20, the interior of the box being divided into separate compartments by the partitions 21 and 22 so that conductors of different types may be readily passed through the box, splices made, and branch circuits started, without the necessity of employing any extra insulation to maintain the conductors separate one from the other. The entrance to the box is divided into an upper and lower entrance way by means of a forwardly extending shelf-like structure 23, one type of conductor entering or leaving the box above the shelf 23, and another type of a conductor entering or leaving the box below the shelf 23. Adjacent each side wall thereof, the box is provided with an adjustable and laterally extending wing 24 having a portion 25 extending inwardly substantially at right angles thereto, the inwardly extending portion being in juxtaposed relationship with the corresponding wall of the box and provided with an elongated slot 26 through which the shank of a stud bolt or rivet 27 passes, the stud bolt being engaged in the box wall. In this manner the wing is rendered adjustable, it being movable outwardly and inwardly upon the stud bolt 27.

It is highly probable that the cover in most instances will also be utilized in connection with a base board construction which is a part of a flexible distribution system and includes a base 28 (Figures 2 and 3) preferably of identical configuration with the cover 10. Adjacent a junction or outlet box installation, the base 28 may be terminated or a portion thereof cut out and removed to make room for the cover which in effect forms an integral part of the base 28.

As seen more clearly in Figures 3 and 4, the box 20 is preferably set in the wall 13 behind the base 28. The cover, the body portion of which is provided with a pair of spaced vertically extending slots 29 through which the shank of a stud bolt 30 may pass, is adjustably attached to the wings 24 of the box 20 by engaging the stud bolts 30 in apertures 31 in the wings. Now, assuming that the box occupies a rather deeply set position as indicated in Figures 3 and 4, so that when the cover is attached to the wings 24 it is disposed rearwardly of the base 28, it is then only necessary to slide the wings outwardly upon the stud bolt 27 to make the cover fit perfectly with the base 28, as indicated by the dotted lines in Figure 3 and by the lowermost dotted structure in Figure 4. If, however, the box occupies a rather low position so that when the cover is attached to the wings 24 the same is below the base 28, it is simply necessary to slide the cover vertically on the stud bolts 30 until the side edges thereof coincide with the adjacent edges of the base as indicated by the uppermost dotted lines in Figure 4.

When the cover is positioned in exact conformity with the adjacent ends of the base 28, the cover is secured at each end thereof to the base 28 by means of clips 32 secured for example by spot welding, to both the base and the cover. These clips 32 not only function to unite the cover and base, but also establish a ground connection between these two elements wherever the same is needed, and further, the clips due to their upturned forward ends 33 serve to retain the conductors in their respective raceways. In this instance, low tension conductors 34 occupy the raceway 14, and relatively high tension conductors occupy the raceway 15.

To permit the conductors 34 and 35, or branch conductors therefrom, to enter the box 20 the body portion 10 of the cover is provided with a relatively large opening divided transversely into an upper opening 36 and a lower opening 37 by means of a horizontally extending portion 38 of a box-like structure 39 secured to the front of the cover by means of laterally extending lugs 40. The portion 38 of the box-like structure 39 preferably coincides with the upper surface of the bead 16, and in many instances when the cover is attached to a box rests upon the shelf 23 of the box. However, it will be noted that the box-like structure 39 has a downwardly extending forward portion which effectively embraces the edges of the shelf 23 so that a distinct separation is at all times maintained between the openings 36 and 37 even when the cover is adjusted vertically relatively to the box.

In Figure 2, a finished installation is indicated, wherein a low tension conductor 34 extends along the upper raceway 14 in both the base 28 and the cover, and a branch line 34a may be extended from this conductor through the opening 36 in the cover and into the box 20 above the shelf 23. In like manner, a branch line 35a may be extended from the conductor 35 which occupies the lower raceway 15, through the opening 37 in the cover and into the box 20 below the shelf 23. It will be noted that there is ample room for properly splicing the various conductors without any danger of their becoming too close to one another, and also that there is no necessity of employing any insulation for the conductors other than that which is commonly provided to properly form the conductor as the same is purchased upon the open market. After the proper connections, etc. are made a front plate 41 is preferably mounted over the base and cover to provide an attractive appearance for the interior of a room or the like. The cover 41 has an agularly bent upper margin which seats behind a plurality of tongues 42 struck from the cover and base, and the lower margin of the plate 41 seats within the groove 18 in both the cover and base.

Although the cover is shown in the drawings and described hereinabove as associated with an outlet or junction box, it is obvious that the cover may be equally well employed with various distribution boxes and in various distribution systems. Therefore, it is to be understood that where the terms outlet or junction box is used herein and in the appended claims, the same is to be construed to mean any form of distribution box, and where the term base is used the same is to be construed as including various types of moulding, interior stripping, etc.

From the foregoing, it will be apparent that I have provided an outlet or junction box cover which may be readily and easily installed, and which is sufficiently flexible to compensate for practically any irregularities or defects in construction adjacent any particular place of installation. Moreover, the cover not only provides separate and distinct conduit-like passageways for individual conductors, but also permits these conductors to enter and leave their respective passageways still kept separate and apart from each other. Further, the present invention is easily incorporated in flexible distribution systems, is pleasing in appearance, very durable, and may be economically manufactured.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination, a junction box having a member extending therefrom to divide the entrance opening to said box, and a cover for said box having an opening therein, a forwardly extending box-like portion dividing said last mentioned opening to correspond with said entrance opening, and said cover having means for adjustably connecting the same on said box, said box-like portion receiving said member to permit relative movement between said junction box and cover.

2. In combination, a dished cover for a junction box, said cover having outwardly deflected lateral flanges, a series of aligned tongues on one of said flanges, a front plate for said cover having a deflected lateral edge for insertion between said tongues and associated flange, and means formed on the other of said flanges for slidably receiving the other lateral edge of said plate.

3. In combination, a wall base housing having a plurality of separate passages for conductors, a junction box for disposition in a wall, a cover for said box of a similar configuration to said housing and having an opening therein giving entrance to said box, a forwardly extending box like portion dividing said opening into upper and lower entrances to correspond to the separate passages in said base, and a face plate closing said cover and said housing.

4. In combination, a wall base housing having a plurality of separate passages for conductors, a junction box having a member extending therefrom to divide the entrance opening, a cover for said box of similar configuration to said base housing and having an opening into said box, a forwardly extending box like portion adjustably engaging said member to divide said last said opening to correspond with said entrance opening, and a front plate serving to close said cover and said housing.

5. In combination, a wall base housing having a plurality of separate passages therein for conductors, a junction box having a plurality of compartments to correspond to said passages, a cover for said junction box having a configuration similar to said base, and in alignment therewith, said cover having an opening giving entrance to said compartments, and a box like member supported by said cover and dividing said opening into upper and lower entrances.

In testimony whereof I have hereunto subscribed my name.

WINGATE S. THOMAS.